United States Patent [19]

Hölter et al.

[11] 4,432,776

[45] Feb. 21, 1984

[54] PROCESS FOR FILTERING SEPARATORS IN DRY CHEMISORPTION

[75] Inventors: Heinz Hölter, Beisenstrasse 39-41, 4390 Gladbeck, Fed. Rep. of Germany; Heinz Gresch, Dortmund-Derne; Heinrich Igelbüscher, Gladbeck, both of Fed. Rep. of Germany

[73] Assignee: Heinz Hölter, Gladbeck, Fed. Rep. of Germany

[21] Appl. No.: 367,146

[22] Filed: Apr. 9, 1982

Related U.S. Application Data

[63] Continuation of Ser. No. 182,737, Aug. 29, 1980, abandoned.

[30] Foreign Application Priority Data

Sep. 1, 1979 [DE] Fed. Rep. of Germany ....... 2935464

[51] Int. Cl.³ ............................................. B01D 53/10
[52] U.S. Cl. ........................................... 55/77; 55/96; 55/99; 55/262; 55/341 R; 55/390
[58] Field of Search ................. 55/74, 77, 96, 99, 262, 55/286, 287, 390, 341 R, 341 H, 341 HM

[56] References Cited

U.S. PATENT DOCUMENTS

| 2,500,851 | 3/1950 | Miller ................................ 55/287 |
| 2,875,844 | 3/1959 | Pring ................................. 55/77 |
| 3,092,478 | 6/1963 | Smith ................................ 55/262 |
| 3,777,458 | 12/1973 | Dence ............................. 55/341 R X |
| 3,951,627 | 4/1976 | Barr, Jr. et al. ............... 55/341 R X |
| 4,010,013 | 3/1977 | Murayama ........................ 55/286 |
| 4,061,476 | 12/1977 | Holter et al. ....................... 55/77 |
| 4,097,251 | 6/1978 | Murayama et al. ........... 55/262 X |
| 4,158,554 | 6/1979 | Bundy et al. ................. 55/341 R X |
| 4,220,457 | 9/1980 | Fredriksen ..................... 55/287 X |
| 4,260,399 | 4/1981 | Kawasaki ......................... 55/96 X |

FOREIGN PATENT DOCUMENTS

| 2449940 | 4/1975 | Fed. Rep. of Germany ........ 55/262 |
| 1501866 | 2/1978 | United Kingdom ................. 55/262 |

*Primary Examiner*—Robert H. Spitzer
*Attorney, Agent, or Firm*—James Creighton Wray

[57] ABSTRACT

A process for cleaning filtering separators used in dry chemisorption systems. A maximum of 1-2% of the total filter area is in the cleaning process at any given time, to provide for utmost efficiency of the chemisorption activity. In the cleaning stage, the separators are cleaned by shock devices or similar means and are coated with fresh chemisorption mass before being returned to the chemisorption system.

2 Claims, 1 Drawing Figure

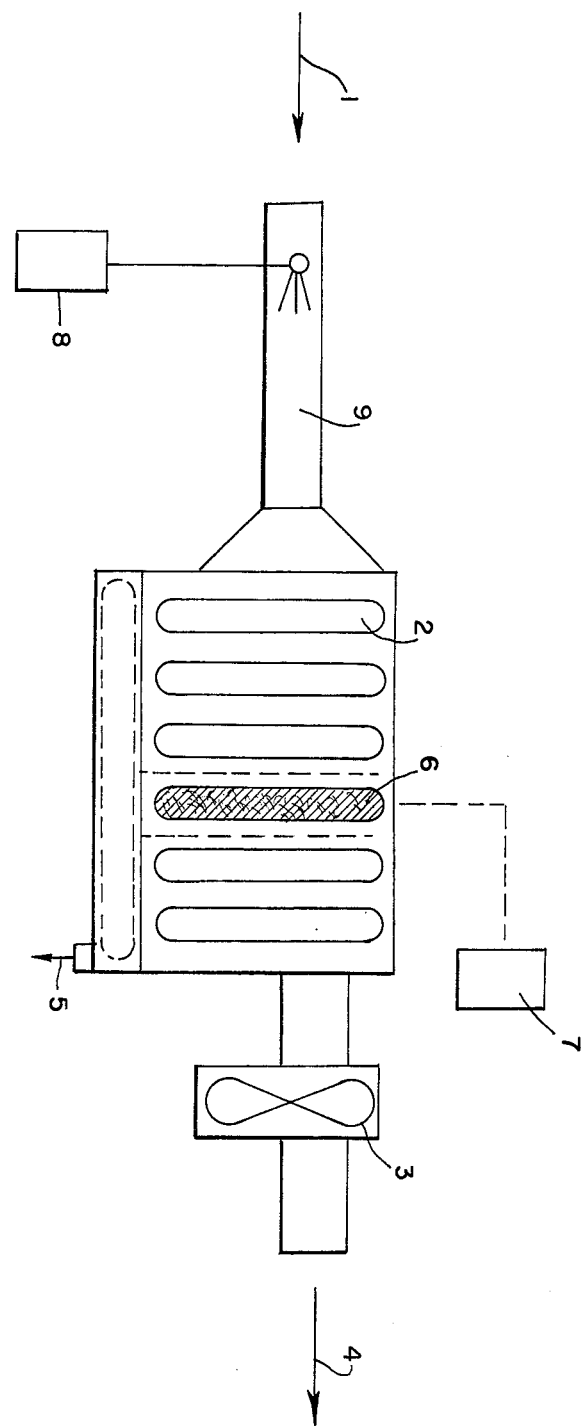

PROCESS FOR FILTERING SEPARATORS IN DRY CHEMISORPTION

This application is a continuation, of application Ser. No. 182,737, filed Aug. 29, 1980 now abandoned.

The accumulation of contaminants in waste gases onto dry absorption agents has been widely applied in recent times.

Wet processes frequently cause a sewage load problem, while dry processes can often be strengthened by pelletizing with a binding agent of the waste product, so that it resists leaching by ground or rain water and can, therefore, be transferred to a landfill.

German patent DE-OS No. 26 15 828, GE No. 15 51 356 and U.S. Pat. No. 4,061,476 of the applicant, mention devices for achieving maximum effectiveness in the chemisorption process which are characterized by a reactor stage in the contact path and by wet separating filter separators in single or double separation models.

Conventional filter separators, which are cleaned by vibration or air shock, are not suitable, in their present form, to ensure utmost effectiveness as the final system in a separation process. To minimize transmittance, the invention provides for the use of filter separators for the chemisorption, in which a maximum of 1–2% of the total filter area is in the cleaning stage at any one time and moreover, this filter area is coated with a dry chemisorption mass, preferably prior to contact with the contaminant gases, and before the contaminants to be reacted and separated contact the filter area.

In its simplest form, this objective is obtained by selecting, for instance, a filter system including 100 individual filter pockets. Only one filter pocket or filter hose is cleaned at a time, by shock devices or similar means, so that not less than 98–99% of the entire filter area remains in the flow path and is subjected to constant loading in the chemisorption process.

In large plants this concept, naturally, may be based on 200 or more individual units.

If plants are of a size which require several individual 100 filter units, the invention provides that the percentage of filters being disengaged from the total system and being cleaned is carried out so that cleaned filters are coated with fresh chemisorption mass before being returned to the chemisorption process, i.e. before coming into contact with contaminants.

The inventive arrangement is depicted in the enclosed drawing:

1—crude gas
2—filter elements
3—fan
4—purified gas
5—exhausted chemisorption means discharge
6—individual chamber with one or several filter elements
7—chemisorption means feed for the individual chamber
8—chemisorption means feed for the entire tissue filter system
9—reaction stage which can be provided with contact elements It is understood, that, without deviating from the basic concept, the invention is not restricted to the individually described features, but permits numerous variations thereof, for example, it is possible to construct tissue filters for the charge of the chemisorption mass in such a way that perferably not more than 1–2% of the entire filter area is cleaned at one time, and upon completion of the cleaning process, the filter area is coated with fresh chemisorption mass prior to its contact with contaminant gases.

We claim:

1. A process for cleaning filtering separators used in dry chemisorption systems comprising flowing contaminated gas through an inlet pipe to a reaction stage feeding chemisorption product into the reaction stage through the inlet pipe, reacting the contaminated gas and the chemisorption product in a reaction stage before flowing the contaminated gas and the chemisorption product into the filter system, feeding the contaminated gas and the chemisorption product from the inlet pipe and reaction stage into a stationary horizontally extended filter system having plural vertical filter elements arranged in separate filter pockets and collecting contaminants and chemisorption products below the system, flowing the contaminated gas and chemisorption product into fixed, vertically arranged tissue filters in each of about 100 or more filter pockets, flowing purified gas outward from the tissue filters, the filter pockets, and shielding and cleaning one filter pocket at a time from incoming reacted contaminated gas and chemisorption product and then coating the cleaned filter in the pocket by flowing fresh chemisorption product downward over the one filter in the one pocket removing chemisorption products and contaminants from beneath the filter system and drawing cleaned gas from the filter system through an outlet separate from the inlet pipe with an exhaust fan, wherein the shielding, cleaning and coating steps comprise locating a closed shield over one pocket.

2. Separation apparatus for separating contaminants from crude gas comprising a source of crude gas, a gas inlet pipe connected to the source of crude gas, chemisorption material feed means connected to the gas inlet pipe for feeding chemisorption materials into the crude gas within the gas inlet pipe, a reaction stage connected to the gas inlet pipe for reacting chemisorption material with the crude gas and thereby drawing contaminants from the crude gas into the chemisorption material, plural filter chambers, means for connecting the plural filter chambers to the reaction stage for flowing the gas and chemisorption materials from the reaction stage into the filter chambers, means for severally disengaging individual filter chambers from the total system, means for cleaning exhausted chemisorption materials from the filter chambers disengaged from the filter system, means for coating filters in the filter chamber disengaged from the filter system with fresh chemisorption materials, and means for returning the cleaned chambers with freshly coated filters to the filter system to receive gas and chemisorption materials from the reaction stage, means for discharging exhausted chemisorption materials from below the chambers separate from the inlet pipe, and means for withdrawing purified gas from the filter system, wherein the means for disengaging the filter chambers comprises shielding individual filter chambers from the crude gas stream during cleaning and coating with fresh chemisorption material, and wherein the individual chamber chemisorption material feed means is connected to the shielding means for coating filters within the filter chamber during the shielding, and wherein the exhausted chemisorption discharge means is connected to all of the chambers and is severally connected to each chamber, and wherein the shielding means shields from about 1 to about 2 percent of the chambers in the filter system from the remainder of the filter system during disengaging, cleaning and coating.

* * * * *